United States Patent
Huber et al.

(10) Patent No.: US 7,159,781 B2
(45) Date of Patent: Jan. 9, 2007

(54) SCANNING UNIT FOR A POSITION MEASURING DEVICE

(75) Inventors: Walter Huber, Traunstein (DE); Volker Hoefer, Traunreut (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 11/357,596

(22) Filed: Feb. 16, 2006

(65) Prior Publication Data
US 2006/0186206 A1    Aug. 24, 2006

(30) Foreign Application Priority Data
Feb. 22, 2005    (DE) .................... 10 2005 009 043

(51) Int. Cl.
*G02B 5/00* (2006.01)
*G06K 7/10* (2006.01)

(52) U.S. Cl. ............................................. 235/462.32
(58) Field of Classification Search ........... 235/462.32
See application file for complete search history.

(56) References Cited

U.S. PATENT DOCUMENTS

| | | | | |
|---|---|---|---|---|
| 4,602,436 A | * | 7/1986 | Ernst | 33/707 |
| 5,239,592 A | * | 8/1993 | Kameyama et al. | 382/138 |
| 5,583,798 A | * | 12/1996 | Franz et al. | 702/127 |
| 5,646,730 A | * | 7/1997 | Mitchell et al. | 356/499 |
| 5,994,692 A | * | 11/1999 | Holzapfel | 250/237 G |
| 6,541,761 B1 | | 4/2003 | Holzapfel et al. | |
| 6,742,275 B1 | * | 6/2004 | Mayer et al. | 33/707 |

FOREIGN PATENT DOCUMENTS

EP    1 081 457    3/2001

* cited by examiner

*Primary Examiner*—Uyen-Chau N. Le
(74) *Attorney, Agent, or Firm*—Kenyon & Kenyon LLP (57) ABSTRACT

A scanning unit for a position measuring device for scanning a measuring graduation thereof, includes a scanning structure provided on a carrier and formed such that, by interaction of electromagnetic radiation, with the measuring graduation and the scanning structure, a periodic stripe pattern is generated. A detector arrangement includes detector elements of different phases that generate output signals having a phase shift. The detector elements form a periodic pattern, and each detector element is assigned exactly one region of the scanning structure referred to as a bar. The detector elements are combined to form two detector groups. Detector elements of the same phase belong to the same detector group, and the detector elements within one detector group are interconnected. The bars of each detector group cover an active area of equal size. The area center of gravity of the area covered by the bars of the detector groups coincide.

21 Claims, 6 Drawing Sheets

SCANNING UNIT FOR A POSITION MEASURING DEVICE

CROSS-REFERENCE TO RELATED APPLICATIONS

The present application claims priority to Application No. 10 2005 009 043.5, filed in the Federal Republic of Germany on Feb. 22, 2005, which is expressly incorporated herein in its entirety by reference thereto.

FIELD OF THE INVENTION

The present invention relates to a scanning unit for a position measuring device, e.g., for scanning a measuring graduation of the position measuring device.

BACKGROUND INFORMATION

Such a scanning unit includes a scanning structure provided on a carrier and formed such that by interaction of an electromagnetic radiation (e.g., in the form of light), used for scanning the measuring graduation, both with the measuring graduation and with the scanning structure, a periodic stripe pattern is generated. The scanning unit further includes a detector arrangement for detecting that stripe pattern, which is made up of a plurality of detector elements of different allocated phases arranged one after another, the arrangement of detector elements of different phases forming a periodic pattern with respect to the phases. Each detector element is assigned exactly one partial area, referred to as a bar, of the scanning structure. The detector elements are furthermore combined to form two detector groups such that detector elements of the same phase belong to the same detector group. The detector elements combined to form a detector group are in each case interconnected for generating an output signal of the detector arrangement. This is accomplished regularly in the manner that, in each case detector elements of a first phase (e.g., of phase 0°) and the phase inverted to it (thus, of phase 180° in the example) are interconnected to form a first detector group. Detector elements of a further phase different therefrom (e.g., of phase 90°) and the phase inverted to it (thus, of phase 270° in the example) are interconnected to form a second detector group. The detector elements of a specific phase are interconnected differentially with detector elements of the phase inverted to it.

A periodic arrangement of detector elements should be understood not as an infinite period in the strict mathematical sense, but rather an arrangement of detector elements of different phase, such that the detector elements are arranged one after another with varying phase by in each case providing a detector element of every other phase exactly once between two detector elements of the same phase.

In European Published Patent Application No. 1 081 457, a position measuring device having a scanning unit of the type indicated at the outset is described, the detector arrangement of which has a plurality of detector elements of the phases 0°, 90°, 180° and 270° arranged one after another, the detector elements of the phases 0° and 180° and the detector elements of the phases 90° und 270° being interconnected at the output side. The arrangement of detector elements is periodic in terms of the assigned phases, i.e., a detector element of the phase 0° is always followed by a detector element of the phase 90°, after that, in turn, a detector element of the phase 180°, and finally a detector element of the phase 270°. Thereupon, this period repeated, beginning with a detector element of the phase 0°.

The phase information with respect to the detector elements relates in each case to the position of the respective detector element within a period formed by four detector elements, which is such that the output signals generated by adjacent detector elements each have a phase shift of 90° relative to each other. In this context, the detector elements having a phase shift of 180° relative to each other, which accordingly form the next neighbors but one in the detector arrangement, are interconnected differentially, so that their output signals are combined to form one unified output signal of the detector arrangement.

If such a scanning unit is used to scan a measuring graduation that extends along a curved path, for example, a measuring graduation applied on a drum having a defined radius, a phase-angle error may occur between the signals generated by the two detector groups, because the phase of the Vernier stripe pattern, which is generated by interaction of the electromagnetic radiation (light), used for the scanning, with the measuring graduation and the scanning structure, does not have an exact saw-tooth shape.

SUMMARY

Example embodiments of the present invention may improve a scanning unit of the type mentioned above.

Accordingly, the bars of the scanning structure may be formed and arranged such that the totality of the scanning-structure bars assigned to the first detector group and the totality of the bars assigned to the second detector group in each case cover an active area of equal size on the carrier of the scanning structure. The area center of gravity of the area covered by the totality of the bars assigned to the first detector group on one hand, and the area center of gravity of the area covered by the totality of the bars assigned to the second detector group on the other hand coincide. Due to the symmetrical arrangement of bars of the scanning structure in the manner that the totality of the bars assigned to the first detector group and the totality of the bars assigned to the second detector group each have the same area center of gravity, both specified totalities of bars additionally covering an equal active area on the carrier of the scanning structure, the occurrence of phase-angle errors may be avoided when scanning curved measuring graduations.

Since both totalities of bars have the same area center of gravity, i.e., their two area centers of gravity coincide, means that the two (coinciding) area centers of gravity—observed in the extension direction of the scanning structure—are arranged at the same location in the direction of that extension axis.

The active area of the scanning structure should be understood to be the total area of the scanning structure which, together with the measuring graduation, contributes to the formation of a stripe pattern because of the interaction of electromagnetic radiation with the measuring graduation on one hand, and with the scanning structure on the other hand. In particular, those layers are not included which absorb the electromagnetic radiation used for scanning, and therefore are designated as non-active or inactive layers.

According to an example embodiment of the present invention, such an arrangement of bars of the scanning structure may be achieved by arranging the totality of bars, assigned to one of the two detector groups, symmetrically relative to an axis extending through the area center of gravity of that arrangement. In so doing, that axis intersects one of the bars, so that it is arranged symmetrically relative to the axis. It is further provided that the totality of bars assigned to one of the two detector arrangements has one bar more than the totality of bars assigned to the other of the two detector groups.

The symmetrical arrangement of that totality of bars of the scanning structure is accomplished in the manner that bars of the scanning structure which are assigned to detector elements of one and the same phase each have a partner in mirror symmetry on the other side of the axis extending through the area center of gravity.

The totality of bars having one bar more than the other totality may be the totality of bars which is configured symmetrically relative to an axis extending perpendicular to the extension direction of the scanning structure through the area center of gravity.

So that the totality of bars which has one bar more than the other totality of bars of the scanning structure covers the same active area on the carrier of the scanning structure, in the case of the first-named totality of bars, two bars positioned symmetrically relative to each other have a smaller active area than the remaining bars of the scanning structure. In this context, these two bars are each assigned to detector elements of the same phase, and in so doing, e.g., to detector elements of a different phase than the bar which is intersected by the axis of symmetry extending through the area center of gravity.

The active area of the bars may be reduced, for example, in that the bars have a smaller elongation transversely to the direction along which the plurality of bars of the scanning structure are positioned one after another, than the remaining bars. The bars having reduced active area may include a plurality of bar regions, set apart relative to each other, which are arranged next to each other transversely to the direction along which the individual bars are disposed one after another.

The subcenters of gravity of all bars of the scanning structure that are assigned to detector elements of one and the same phase may coincide with the above-defined area center of gravity of the overall arrangement.

To this end, in the case of the subgroups of bars which are assigned to detector elements of one phase and are not positioned symmetrically relative to the axis extending through the area center of gravity, the active areas of the bars may vary such that their subcenter of gravity nevertheless coincides with the area center of gravity of the overall arrangement. To accomplish that, for those bars, the active area of a bar are a function of its distance from the axis of symmetry.

According to an example embodiment of the present invention, a scanning unit for a position measuring device for scanning a measuring graduation of the position measuring device includes: a carrier; a scanning structure provided on the carrier and adapted to generate a periodic stripe pattern by interaction of electromagnetic radiation used to scan the measuring graduation; and a detector arrangement adapted to detect the stripe pattern, the detector arrangement including a plurality of detector elements of different phases arranged one after another and are adapted to generate output signals having a phase shift represented by a respective phase. The detector elements of different phases are arranged one after another to form a periodic pattern, exactly one region of the scanning structure assigned to each of the detector elements, the detector elements combined to form two detector groups, at least detector elements of a same phase each belong to the same detector group, the detector elements within a detector group interconnected to generate a detector signal. Bars of the scanning structure, corresponding to each region of the scanning structure assigned to each of the detector elements, are formed and arranged such that a totality of the bars assigned to a first detector group and a totality of the bars assigned to a second detector group each cover an active area of equal size on the carrier of the scanning structure during position measurement, the area covered by the totality of bars assigned to the first detector group and the area covered by the totality of bars assigned to the second detector group have a same area center of gravity.

Each detector element may correspond to one of four different phases. The detector elements corresponding to a first pair of the four phases may form the first detector group, and the detector elements corresponding to a second pair of the four phases may form the second detector group.

The detector elements corresponding to different phases may be arranged alternatingly one after another, and detector elements of every other phase may be arranged between two detector elements of a same phase.

The totality of the bars assigned to at least one of the two detector groups may be arranged symmetrically relative to an axis extending through the area center of gravity perpendicular to an extension direction of the scanning structure.

The area center of gravity may be arranged in one of the bars of the scanning structure, and the bar in which the area center of gravity is arranged may be formed symmetrically relative to an axis extending through the area center of gravity perpendicular to an extension direction of the scanning structure.

The bars of the totality of bars that includes the bar in which the area center of gravity is arranged may be arranged symmetrically relative to the axis.

A first one of the totalities of bars may include one more bar than a second one of the totalities of bars.

Both totalities of bars may be arranged symmetrically relative to the axis.

The first totality of bars may include at least two bars arranged symmetrically relative to the axis and having a smaller active area during position measurement than the other bars of the scanning structure.

At least one bar having the smaller active area may have a smaller elongation than the other bars in a direction transverse to the extension direction along which the bars are arranged one after another.

At least one bar having the smaller active area may include a plurality of bar regions set apart from each other.

The bar regions may be set apart from each other along a direction transverse to an extension direction along which the bars are arranged one after another.

At least one bar having the smaller active area may be formed symmetrically relative to an axis extending along an extension direction of the scanning structure.

The bars having the smaller active area may be assigned to detector elements of a different phase than a bar in which the area center of gravity is located.

In a totality of bars arranged symmetrically relative to an axis extending through the area of center of gravity, all bars assigned to detector element having a same phase may be arranged symmetrically relative to the axis.

The area center of gravity of active areas of a subgroup of bars of the totality of bars arranged symmetrically relative to an axis extending through the area of center of gravity assigned to detector elements of a same phase may coincide with the area center of gravity of active areas of all bars of the totality of bars arranged symmetrically relative to an axis extending through the area of center of gravity.

Area centers of gravity of active areas of all subgroup of bars, which are assigned to detector elements of a same phase, may coincide with the area center of gravity of the two totalities of bars.

Each subgroup of bars that does not include the bar formed symmetrically relative to the axis may include at least two bars having a reduced active area compared to the other bars.

The scanning structure may be formed on a scanning plate.

The detector elements to which the bars of the scanning structure are assigned may be arranged one after another in a same order as respectively assigned bars of the scanning structure.

According to an example embodiment of the present invention, a position measuring device includes a measuring graduation and a scanning unit adapted to scan the measuring graduation. The scanning unit may be arranged as described above.

Further details and aspects of example embodiments of the present invention are described in more detail below with reference to the appended Figures.

DETAILED DESCRIPTION

Figure 6:
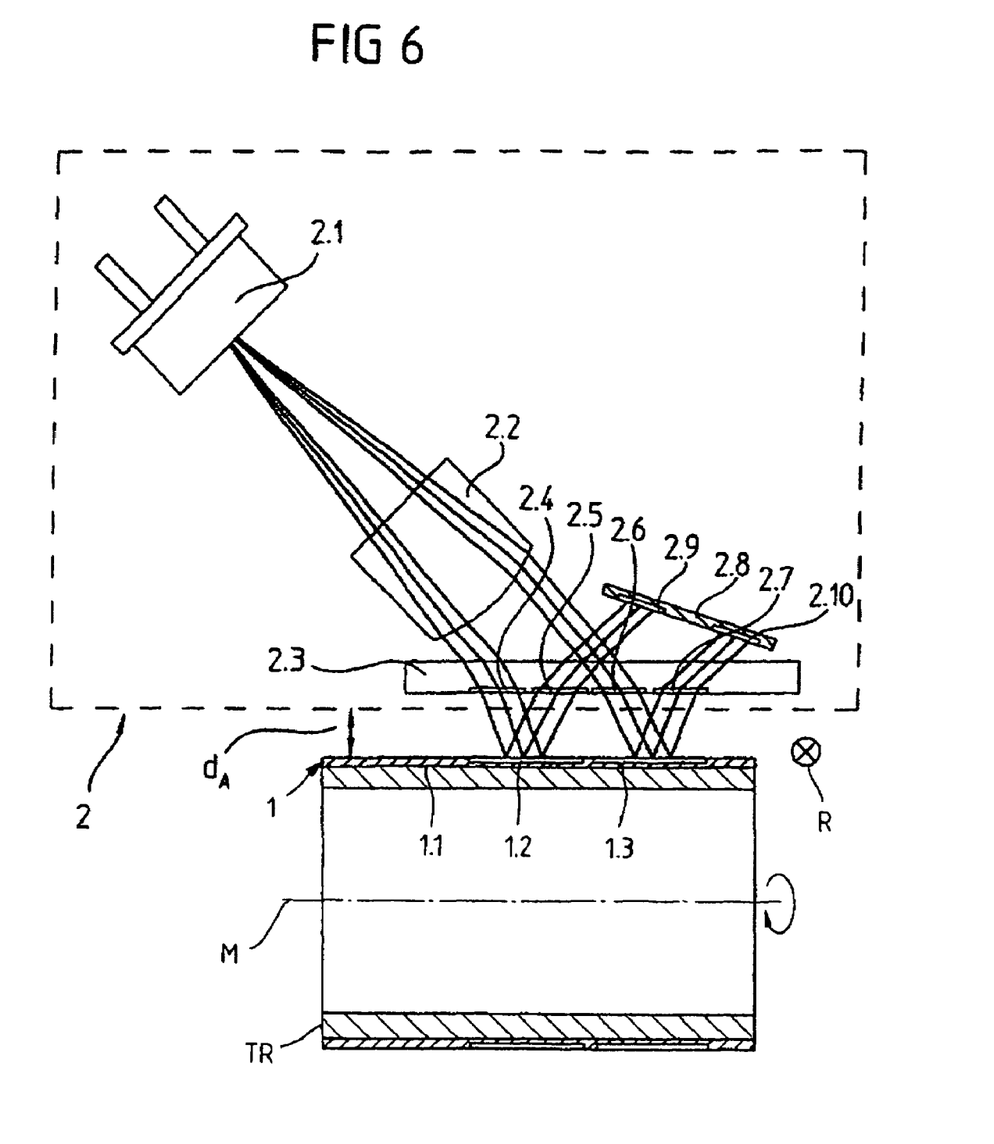
FIG. 6 illustrates a position measuring device in which a scanning structure and detector arrangement illustrated in FIGS. 1 to 5 may be used.

FIG. 6 illustrates a position measuring device in the form of an incident-light or vertical-illumination measuring system which includes a measuring strip 1 encircling an outer surface of a drum T having a circular cross-section, as well as an allocated scanning unit 2. Measuring strip 1 disposed on drum T, as well as scanning unit 2 are movable relative to each other along a measuring direction R in response to a rotary motion of drum T about its axis of rotation or center axis M, measuring direction R being predefined by the rotary motion of drum T about the axis of rotation or center axis M. In this context, measuring strip 1 and scanning unit 2 provided for scanning measuring strip 1 are disposed at a scanning distance $d_A$.

Measuring strip 1 includes a measuring graduation 1.2 which, in a conventional manner, may be in the form of an incremental scale-division track and is disposed on a carrier member 1.1 of measuring strip 1. In addition to measuring graduation 1.2, which is used for generating incremental signals by which a movement of measuring strip 1 of drum T relative to scanning unit 2 is detectable, at least one reference marking 1.3 is provided on carrier member 1.1 of measuring strip 1. With the aid of reference marking 1.3, i.e., by generating a corresponding reference-pulse signal, an absolute reference in the position measuring may be produced in a conventional manner during measuring operation.

Both measuring graduation 1.2 and reference marking 1.3 include a sequence of subsections, alternating in measuring direction R, having different optical reflection properties, e.g., highly reflecting and non-reflecting subsections. The graduation period of incremental measuring graduation 1.2 is denoted in the following by TP. It is defined by the sum of the widths of one highly reflecting and one non-reflecting subsection in measuring direction R.

Reference marking 1.3 includes an aperiodic distribution of subsections having different reflection properties.

Scanning unit 2 of the position measuring device illustrated in FIG. 6 includes a radiation source for electromagnetic radiation in the form of a light source 2.1, a collimator optical system 2.2, a scanning plate 2.3 and a detection unit 2.8. Two window regions having graduation structures 2.4, 2.6 (scanning structures) are provided in scanning plate 2.3, while two further window regions 2.5, 2.7 are transparent, i.e., are without graduation structures. A first pair of window regions 2.4, 2.5 is used in conjunction with further components of the position measuring device for generating the incremental signals used for determining the position of measuring strip 1 relative to scanning unit 2, while the second pair having window regions 2.6, 2.7 is used for generating one or more reference-pulse signals. A first detector arrangement 2.9 and a second detector arrangement 2.10 are provided on detection unit 2.8 for detecting the incremental signals on one hand, and the reference-pulse signals on the other hand. The incremental signals are generated and detected in the manner described in more detail below.

Ray bundles emitted by light source 2.1, e.g., an infrared LED, are parallelized by collimator optical system 2.2 and pass through the graduation structure (scanning structure 2.4) in the one window region of the first window pair used for generating the incremental signals. Subsequently, the ray bundles passing through scanning structure 2.4 in that window region strike measuring graduation 1.2 of measuring strip 1, which in this example is in the form of a reflection measuring graduation. The scanning structure of scanning plate 2.3 and the measuring graduation 1.2 of measuring strip 1 formed by an incremental scale-division track have slightly different graduation periods, so that a periodic Vernier stripe pattern results from the interaction of the ray bundles with the scanning structure on one hand, and with the measuring graduation 1.2 on the other hand.

The ray bundles are reflected by measuring graduation 1.2 in the direction of transparent window region 2.5 of the first window pair of scanning plate 2.3. After passing through that transparent window region 2.5, the ray bundles arrive at first detector arrangement 2.9 of detection unit 2.8. Detector arrangement 2.9 is used for detecting the Vernier stripe pattern and for generating incremental signals which are representative for the relative position of measuring strip 1 with respect to scanning unit 2.

Reference is made to European Published Patent Application No. 1 081 457, which is expressly incorporated herein in its entirety by reference thereto, for further particulars regarding the conventional form of a position measuring device of the type illustrated in FIG. 6.

Figure 5:
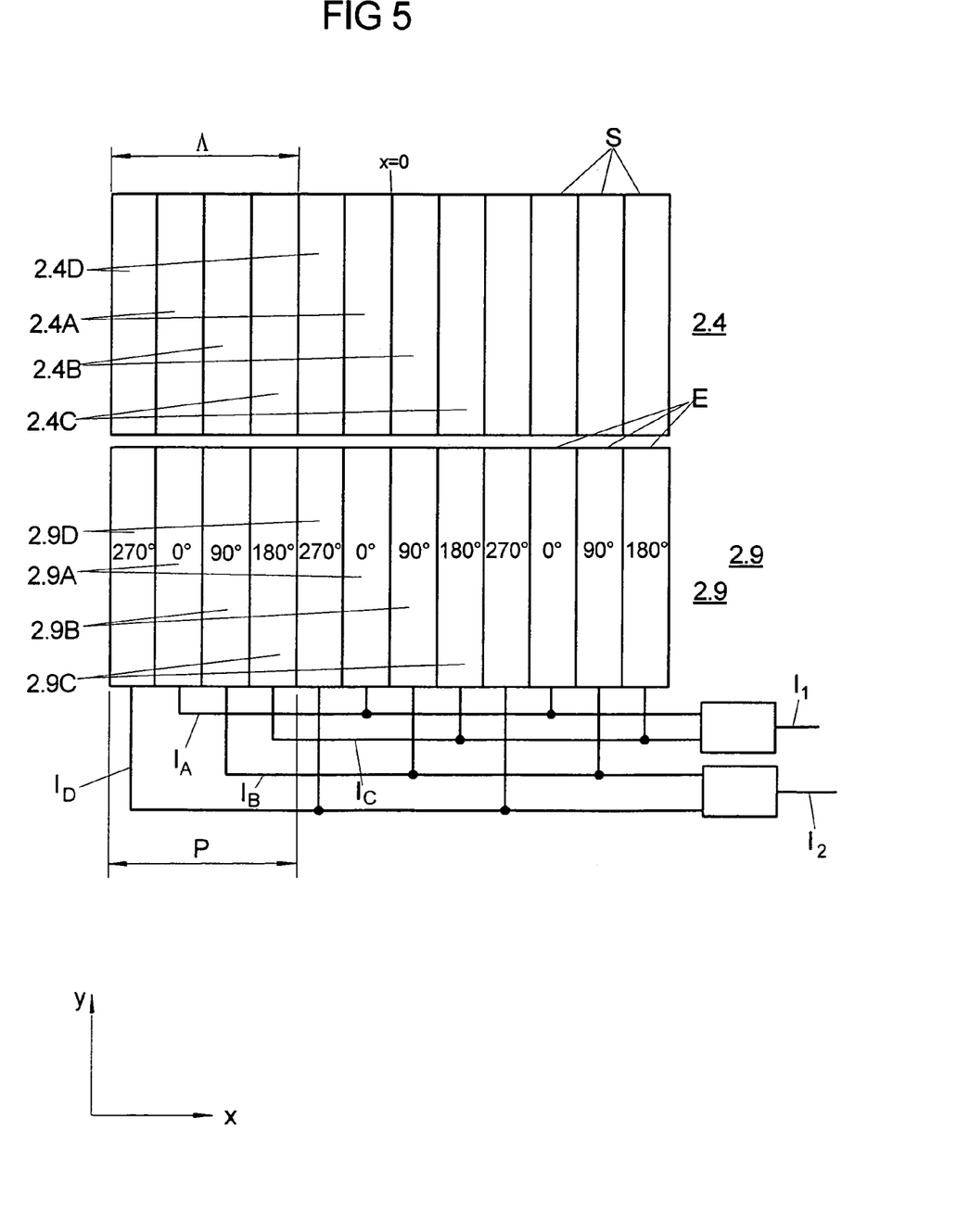
FIG. 5 illustrates a scanning structure and detector arrangement of a scanning unit for a position measuring device.

A detector arrangement 2.9 of detection unit 2.8 illustrated in FIG. 6 is additionally illustrated schematically in FIG. 5. A detector arrangement 2.9 includes a plurality of (rectangular) detector elements E which are arranged one after another along an extension direction x (in FIG. 6 oriented perpendicular to the page plane) extending tangentially with respect to measuring direction R (cf., FIG. 6), and are each formed in elongated fashion transversely to extension direction x.

Detector elements E in detector arrangement 2.9 are arranged periodically in the manner that in each case, four detector elements E form one period P. Each of the individual detector elements E of one period P differ in their phase. To that end, in each period P of detector arrangement 2.9, phase 0° is assigned to a first detector element, phase 90° is assigned to a second detector element, phase 180° is assigned to a third detector element, and phase 270° is assigned to a fourth detector element. To be understood by periodicity of the arrangement of detector elements E in this context is not an infinite period in the strict mathematical sense, but rather a regular, alternating arrangement of individual detector elements E in the manner that between two detector elements E which are assigned to the same phase (e.g., 0°), in each case precisely one detector element of every other phase (thus, e.g., 90°, 180°, 270°) is arranged.

Detector elements E of the same phase are in each case combined to form subgroups 2.9A, 2.9B, 2.9C and 2.9D, all detector elements E of phase 0° being included in a first subgroup 2.9A, all detector elements E of phase 90° being included in a second subgroup 2.9B, all detector elements of phase 180° being included in a third subgroup 2.9C, and all detector elements E of phase 270° being included in a fourth subgroup 2.9D. Detector elements E combined in one of these subgroups 2.9A, 2.9B, 2.9C, 2.9D each have the feature that, upon detecting the Vernier stripe pattern applied to detector arrangement 2.9, they deliver output signals $I_A$, $I_B$, $I_C$ and $I_D$, respectively, of the same phase, the individual output signals $I_A$, $I_B$, $I_C$ and $I_D$ each having a phase shift of 90° relative to each other. However, the four output signals $I_A$, $I_B$, $I_C$, $I_D$, which in each case are generated by one of detector groups 2.9A, 2.9B, 2.9C und 2.9D, are not to be evaluated separately. Rather, two subgroups 2.9A and 2.9C on one hand, as well as 2.9B and 2.9D on the other hand are combined to form a detector group 2.9A, 2.9C or 2.9B, 2.9D in the manner that the output signals of the subgroups of detector elements E, combined in each case to form one detector group, are combined with the aid of differential amplifiers to form two output-side detector signals (incremental signals $I_1$, $I_2$) (push-pull interconnection).

Period Λ of the detector arrangement is also referred to as a Vernier period, and is characterized in that when working with a linear position measuring system (thus, when using detector arrangement 2.9 for scanning a linear scale and not a measuring strip 1 disposed in curved fashion on a drum surface, as illustrated in FIG. 6), the phase of the periodic Vernier stripe pattern increases in each case by 360° to the length of a Vernier period. This corresponds to a sawtooth-shaped phase angle.

If detector arrangement 2.9 includes a total of N*4 detector elements E, which are arranged periodically in the manner described with a Vernier period P, then each phase of the Vernier stripe pattern is read out at a total of N equidistant positions (with the distance Λ of detector arrangement 2.9).

As illustrated in FIGS. 5 and 6, each detector element E of detector arrangement 2.9 is assigned one subsection of scanning structure 2.4 referred to as bar S. Similar to detector elements E of detector arrangement 2.9, bars S are arranged one after another along an extension direction x extending tangentially with respect to measuring direction R, and are formed in elongated fashion along a direction y extending perpendicular to that extension direction x. Bars S—similar to detector elements E—each form longish rectangles in top view.

Detector arrangement 2.9 and associated scanning structure 2.4 are illustrated side-by-side in FIG. 5 to illustrate the interrelationship described above. However, the actual installed state is provided from the position measuring device illustrated in FIG. 6. The view illustrated in FIG. 5 (and, in corresponding manner, in FIGS. 1 to 4 to be discussed below) is selected merely to illustrate the assignment of in each case one bar S of scanning structure 2.4 to exactly one detector element E of detector arrangement 2.9.

Scanning structure 2.4 is subdivided into bars S such that each bar S of scanning structure 2.4 indicates one region of the scanning structure assigned to one specific detector element E of detector arrangement 2.9. In other words, each bar S of scanning structure 2.4 contributes to one specific phase portion of output signals $I_A$, $I_B$, $I_C$ and $I_D$ generated by detector arrangement 2.9. Accordingly, bars S may be subdivided into subgroups 2.4A, 2.4B, 2.4C and 2.4D such that each of subgroups 2.4A, 2.4B, 2.4C and 2.4D of bars S is assigned to precisely one subgroup 2.9A, 2.9B, 2.9C and 2.9D, respectively, of detector arrangement 2.9. Thus, for example, bars S in first subgroup 2.4A are assigned to detector elements E of first subgroup 2.9A of detector arrangement 2.9, and contribute to the generating of output signals $I_A$ having the phase angle of 0°. Bars S of a second subgroup 2.4B are assigned to second subgroup 2.9B of detector arrangement 2.9, and contribute to the generating of output signal $I_B$ having the phase angle of 90°. Bars S of a third subgroup 2.4C are assigned to detector elements E of third subgroup 2.9C of detector arrangement 2.9, and contribute to the generating of output signal $I_C$ having a phase angle of 180°. Bars S of a fourth subgroup 2.4D are assigned to detector elements E of fourth subgroup 2.9D of detector arrangement 2.9, and contribute to the generating of output signals $I_D$ having a phase angle of 270°.

In corresponding manner as for detector elements E, bars S may also be assigned a defined period Λ, four bars S assigned to four different detector elements E being combined in each case within one period Λ, e.g., one bar from first subgroup 2.4A which is assigned to one detector element of the phase 0°, one bar from second subgroup 2.4B which is assigned to one detector element of the phase 90°, one bar from third subgroup 2.4C which is assigned to one detector element of the phase 180°, and one bar from fourth subgroup 2.4D which is assigned to one detector element of the phase 270°.

Two of subgroups 2.4A and 2.4C or 2.4B and 2.4D of bars S may in each case be combined such that two totalities of bars S (made up of first and third subgroups 2.4A and 2.4C on one hand, and second and fourth subgroups 2.4B and 2.4D on the other hand) may be formed, which are assigned to detector groups 2.9A, 2.9C and 2.9B, 2.9D, respectively, and which each contribute to generating one of the two incremental signals $I_1$, $I_2$.

It follows from FIG. 5 that the area center of gravity of detector group 2.9A, 2.9C, with which first incremental signal $I_1$ is generated, is shifted in extension direction x by P/8, and the area center of gravity of detector group 2.9B, 2.9D, with which second incremental signal $I_2$ is generated, is shifted in extension direction x by −P/8 relative to the axis of symmetry (x=0) of detector arrangement 2.9 illustrated in FIG. 5. In this context, the specific area center of gravity is calculated from the areas which are covered by detector elements E of specific detector group 2.9A, 2.9C or 2.9B, 2.9D.

This area center of gravity is also referred to as the phase center of gravity, since in each case incremental signals $I_1$ and $I_2$, respectively, of different phase are assigned to the two detector groups 2.9A, 2.9C on one hand and 2.9B, 2.9D on the other hand. Accordingly, the phase center of gravity of first incremental signal $I_1$ is arranged at P/8, and the phase center of gravity of second incremental signal $I_2$ is arranged at –P/8 relative to the axis of symmetry (x=0) of detector arrangement 2.9.

The axis of symmetry (x=0) of detector arrangement 2.9 is illustrated by example in FIG. 5 for a case in which the detector arrangement includes a total of twelve detector elements E, grouped into three periods. However, the observation above holds true correspondingly for detector arrangements having a greater number of detector elements E, and accordingly a greater number of periods.

If detector arrangement 2.9 illustrated in FIG. 5 having assigned scanning structure 2.4 is used for scanning a curved measuring graduation 1.2 (cf., FIG. 6), thus, for example, a measuring graduation 1.2 provided on a measuring strip 1 that extends along the outer periphery of a drum, then the phase of the Vernier stripe pattern generated during the scanning no longer has the exact saw-tooth shape described above for the case when scanning a linear scale. Therefore, individual subgroups 2.9A, 2.9B, 2.9C and 2.9D of detector arrangement 2.9 each no longer detect N exactly equal phases of the Vernier stripe pattern (N indicates the number of periods of the detector arrangement), but rather they are distributed about a setpoint phase. Because of the different area center of gravity (phase center of gravity) of the two incremental signals $I_1$, $I_2$, this leads to a phase angle error between the two incremental signals. To eliminate this problem, the arrangements illustrated in FIGS. 1 to 4 are provided, each characterized by a particular formation of scanning structure 2.4. On the other hand, detector arrangement 2.9 remains unchanged, so that no special detector arrangement may be necessary for scanning curved measuring graduations.

Rather, only a particular formation of the respective scanning structure may be necessary, which is typically provided on a carrier substrate, e.g., in the form of glass, by forming a graduation structure on a surface of the corresponding transparent carrier substrate, for example. In so doing, the specific graduation structure may be formed by periodic amplitude structures and/or phase structures alternately positioned in extension direction x. An amplitude structure is obtained, for example, by the periodically alternating arrangement of transparent and opaque graduation marks. In contrast, a periodic phase structure is provided by a periodic arrangement of graduation marks having a different phase-shifting effect.

The formation of the individual graduation marks for producing a graduation structure suitable for scanning structure 2.4 is not of particular importance. What is of significance is not the fine structure of the graduation structure, but rather only the subsections of the scanning structure, denoted here as bars S, which in each case include a plurality of graduation periods of the finer graduation structure, and are each assigned to one specific detector element E of associated detector arrangement 2.9.

FIGS. 1 to 4 illustrate formation of the scanning structure such that the area centers of gravity (phase centers of gravity) of both totalities of bars S of scanning structure 2.4 (the one totality 2.4A, 2.4C of bars S being formed by first subgroup 2.4A and third subgroup 2.4C, and the second totality 2.4B, 2.4D of bars S being formed by second and fourth subgroups 2.4B and 2.4D) coincide in one single area or phase center of gravity F.

That both totalities of bars S (2.4A, 2.4C on one hand and 2.4B, 2.4D on the other hand) have the same area center of gravity F, that is, their two area centers of gravity F coincide, means that the two (coinciding) area centers of gravity have the same coordinate (x=0) on the x axis extending in extension direction x of scanning structure 2.4.

To that end, for each of the exemplary embodiments illustrated in FIGS. 1 to 4, scanning structure 2.4 is arranged such that one of the totalities (e.g., 2.4A, 2.4C) of bars S has one bar more than the other totality (e.g., 2.4B, 2.4D) of bars S. In this context, a specific totality 2.4A, 2.4C or 2.4B, 2.4D is further characterized in each instance in that it is assigned to one detector group 2.9A, 2.9C or 2.9B, 2.9D of detector arrangement 2.9, so that it contributes to the generation of exactly one of the two incremental signals $I_1$ or $I_2$ of detector arrangement 2.9. In other words, bars S assigned to one totality of bars are in each case characterized in that all bars S of one totality are assigned to detector elements E of detector arrangement 2.9 which are electrically interconnected to form one detector group or one incremental signal resulting therefrom.

Figure 1:
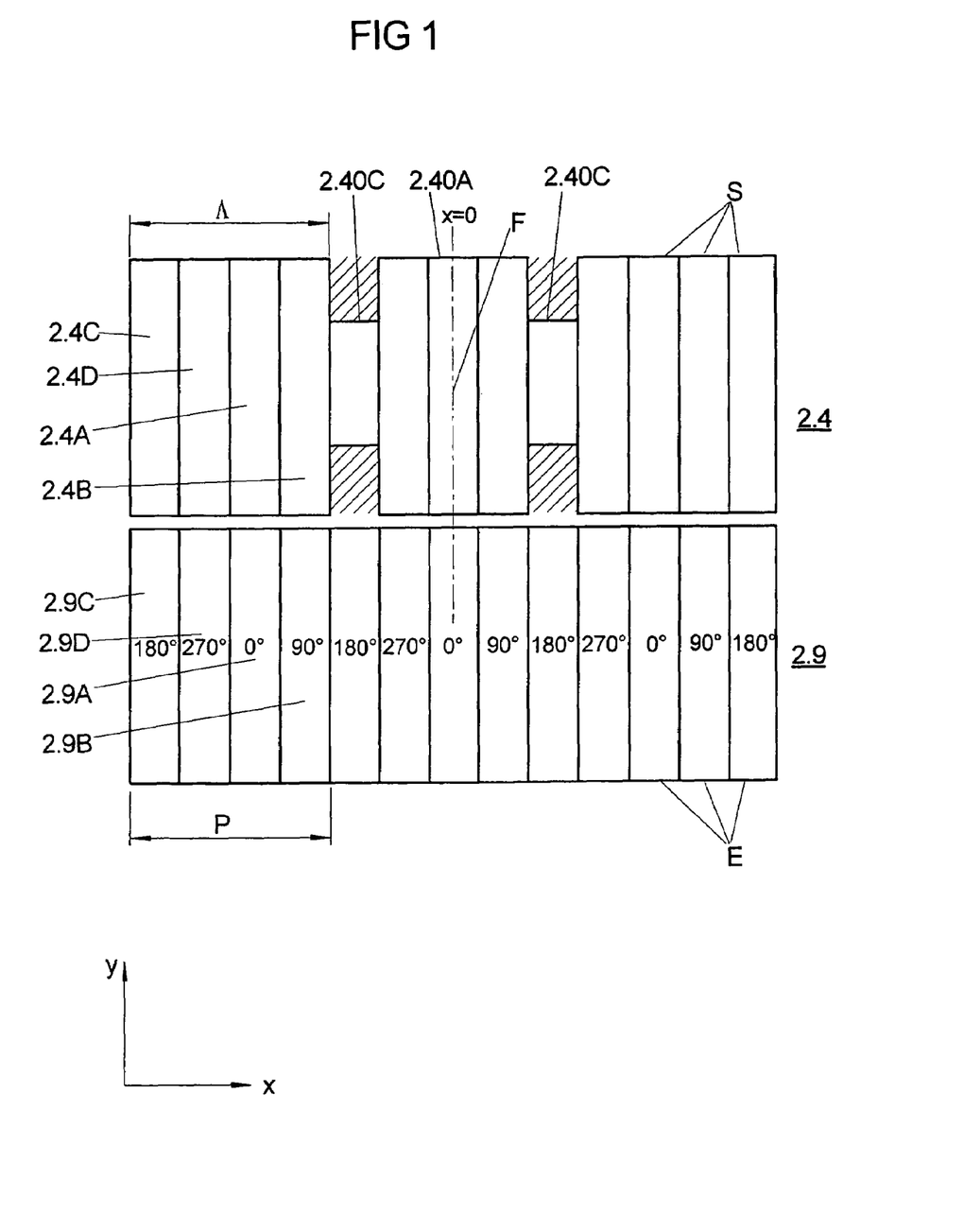
FIG. 1 illustrates an example embodiment of a scanning structure and a detector arrangement for a scanning unit of a position measuring device.

FIG. 1 illustrates a scanning structure 2.4 in which the totality of bars S formed by first and third subgroups 2.4A and 2.4C has one bar more than the totality of bars formed by second and fourth subgroups 2.4B and 2.4D. To provide in this connection that both totalities of bars S supply the same contribution to the respective incremental signal $I_1$ or $I_2$, two bars 2.40C of third subgroup 2.4C are reduced in their elongation, and specifically in the manner that they have only one half as great an elongation in direction y perpendicular to extension direction x of scanning structure 2.4 as remaining bars S of scanning structure 2.4. That reduction in elongation of individual bars 2.40C of scanning structure 2.4 is provided in that regions adjoining remaining, smaller bars 2.40C upwardly and downwardly along specified direction y are arranged to be inactive, especially absorbing (with reference to an optical scanning). These regions are represented by hatching in FIGS. 1 to 4.

The term "optically inactive" in this context should be understood such that regions of the scanning plate provided with scanning structure 2.4 which are denoted as optically not active or inactive do not contribute to the Vernier stripe pattern to be detected at detector arrangement 2.9, and therefore also do not contribute to incremental signals $I_1$, $I_2$ generated in this connection.

Overall, therefore, an arrangement of bars S of the scanning structure results, in which area center of gravity F of totalities 2.4A, 2.4C on one hand and 2.4B, 2.4D on the other hand in each case is located in a bar 2.40A of first subgroup 2.4A of bars S, and specifically such that an axis (x=0) extending perpendicular to extension direction x through area center of gravity F forms an axis of symmetry of specified bar 2.40A, thus intersects it precisely in center. The two bars 2.40C having reduced elongation come from the other subgroup (third subgroup 2.4C) of the same totality 2.4A, 2.4C of bars, and are positioned symmetrically relative to axis x=0 extending through area center of gravity F. The result is that the entire totality of bars S made up of first and third subgroups 2.4A, 2.4C is arranged in mirror symmetry relative to axis of symmetry x=0, i.e., in each case bars S, which are assigned to detector elements E of the same phase (e.g., 0° or 180°) are positioned at the same distance on both sides of axis of symmetry x=0. In concrete terms, bar 2.40A intersected by axis of symmetry x=0 is assigned to a detector element of the phase 0°, while the two bars 2.40C arranged in mirror symmetry relative to axis of symmetry x=0 are each positioned with equal distance on both sides of axis of symmetry x=0. From this it follows that area center of gravity F of the area formed by bars S of first and third subgroups 2.4A, 2.4C on the associated substrate (e.g., glass substrate) coincides with that axis of symmetry x=0.

The same holds true for the totality of bars S of the second and fourth subgroups 2.4B and 2.4D, as well. Here, however, the individual bars S—specific to the phase of the corresponding detector element E—are not arranged symmetrically relative to axis of symmetry x=0 extending through area center of gravity F. Rather, here, in each case one bar S with assigned detector element E of the phase 90° and one bar S with assigned detector element E of the phase 270° are positioned at equal distance on both sides of axis of symmetry x=0. It may be that this results in a symmetrical formation of the second totality 2.4B, 2.4D of bars on the whole relative to axis of symmetry x=0, and also that its area center of gravity F is located on axis of symmetry x=0 and coincides with the area center of gravity of first totality 2.4A, 2.4C of bars. However, second and fourth subgroups 2.4B and 2.4D, respectively, considered by themselves, are not positioned symmetrically relative to axis of symmetry x=0.

In summary, bars S of first subgroup 2.4A in each case are located at locations n*Λ, bars S of second subgroup 2.4B are located at locations (n+¼)*Λ, bars S of third subgroup 2.4C are located at locations (n+½)*Λ, and bars S of fourth subgroup 2.4D in each case are located at locations (n+¾)*Λ, n being an element of the quantity Z of the positive and negative whole numbers inclusive of 0.

In the exemplary embodiment illustrated in FIG. 1, both bars 2.40C, which belong to third subgroup 2.4C, are provided at locations ±½*Λ. However, this position is not required. The symmetrical arrangement of both bars 2.40C of reduced elongation, relative to axis of symmetry x=0, is of significance. Therefore, any locations arranged symmetrically relative to axis of symmetry x=0 may be selected for the position of these two bars 2.40C according to the formula (n+½)*Λ.

Of significance is that, using the described arrangement and formation of scanning structure 2.4, the area centers of gravity of both detector groups (namely, the first detector group made up of first and third subgroups 2.9A, 2.9C on one hand, and the second detector group made up of second and fourth subgroups 2.9B, 2.9D on the other hand) also coincide correspondingly on detector arrangement 2.9 at a point which is located on an axis (x=0) that intersects one detector element E (having the phase 0°) and divides it symmetrically. All detector elements E (having the phases of 0° or 180°) which belong to first detector group 2.9A, 2.9C are accordingly arranged symmetrically relative to that axis of symmetry x=0. Moreover, considered in their entirety, detector elements E (having phases 90° or 270°) coming from second detector group 2.9B, 2.9D are arranged symmetrically relative to axis of symmetry x=0. However, this does not hold true for the two individual, associated subgroups 2.9B and 2.9D, respectively, considered by themselves. Rather, in each case one detector element E of fourth subgroup 2.9D (having the phase 270°) is positioned at equal distance on both sides of axis of symmetry x=0, symmetrically opposite one detector element E of second subgroup 2.9B (having the phase 90°). In this respect, the symmetry of second detector group 2.9B, 2.9D relative to axis of symmetry x=0 is less than the symmetry of first detector group 2.9A, 2.9C, in which detector elements E of the same phase (0° or 180°) are arranged at equal distance on both sides of axis of symmetry x=0.

The total length of scanning structure 2.4 illustrated in FIG. 1 is (N+¼)*Λ, N indicating the total number of periods present, and the additional length of ¼*Λ resulting from the one additional bar S, so that the one totality 2.4A, 2.4C of bars S has exactly one bar more than those of the other totality 2.4B, 2.4D.

With respect to detector arrangement 2.9, no adaptation corresponding to (the special formation of the scanning structure) may be necessary in the arrangement and formation of detector elements E. The reason is, in each case, they contribute to output signals $I_A$, $I_B$, $I_C$ and $I_D$ to be generated and to incremental signals $I_1$ and $I_2$ formed therefrom only to the extent to which a bar S of specific size on scanning structure 2.4 is assigned to them. That is to say, a special formation of detector arrangement 2.9 is not necessary to achieve the previously described symmetry for providing an equal contribution of both detector groups (2.9A, 2.9C on one hand and 2.9B, 2.9D on the other hand). This is provided solely by the formation of scanning structure 2.4.

Figure 2:
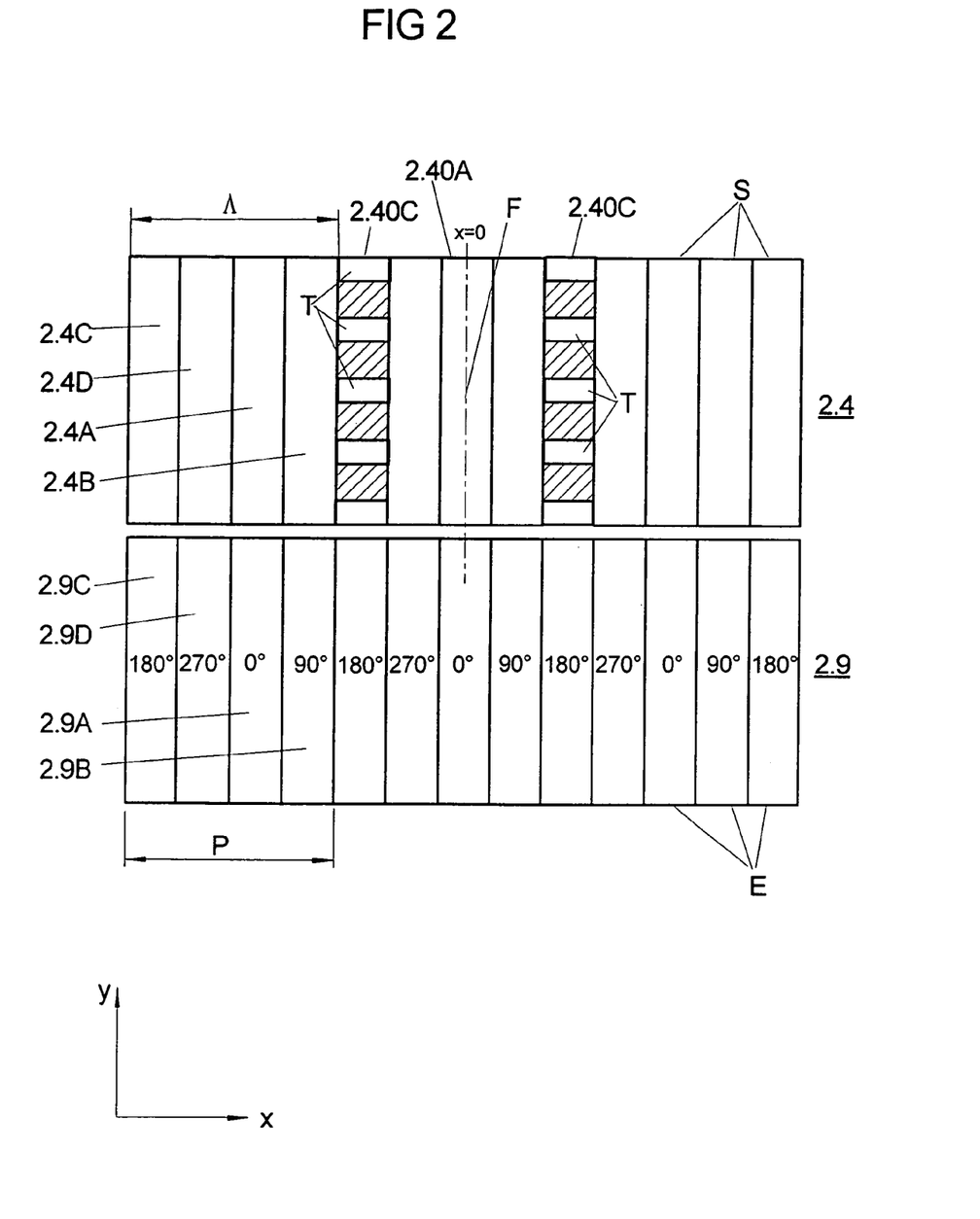
FIG. 2 illustrates an exemplary embodiment of a scanning structure and a detector arrangement for a position measuring device.

FIG. 2 illustrates a modification of the exemplary embodiment illustrated in FIG. 1, a difference being that the two bars 2.40C of reduced area positioned symmetrically on both sides of axis of symmetry x=0 are formed by a plurality of partial sections T (bar regions) arranged one after another along a direction y perpendicular to extension direction x of scanning structure 2.4 and set apart from each other by inactive regions. Like illustrated in FIG. 1, those two bars 2.40C are formed such that they are symmetrical relative to a center axis of scanning structure 2.4 extending in extension direction x.

Figure 3:
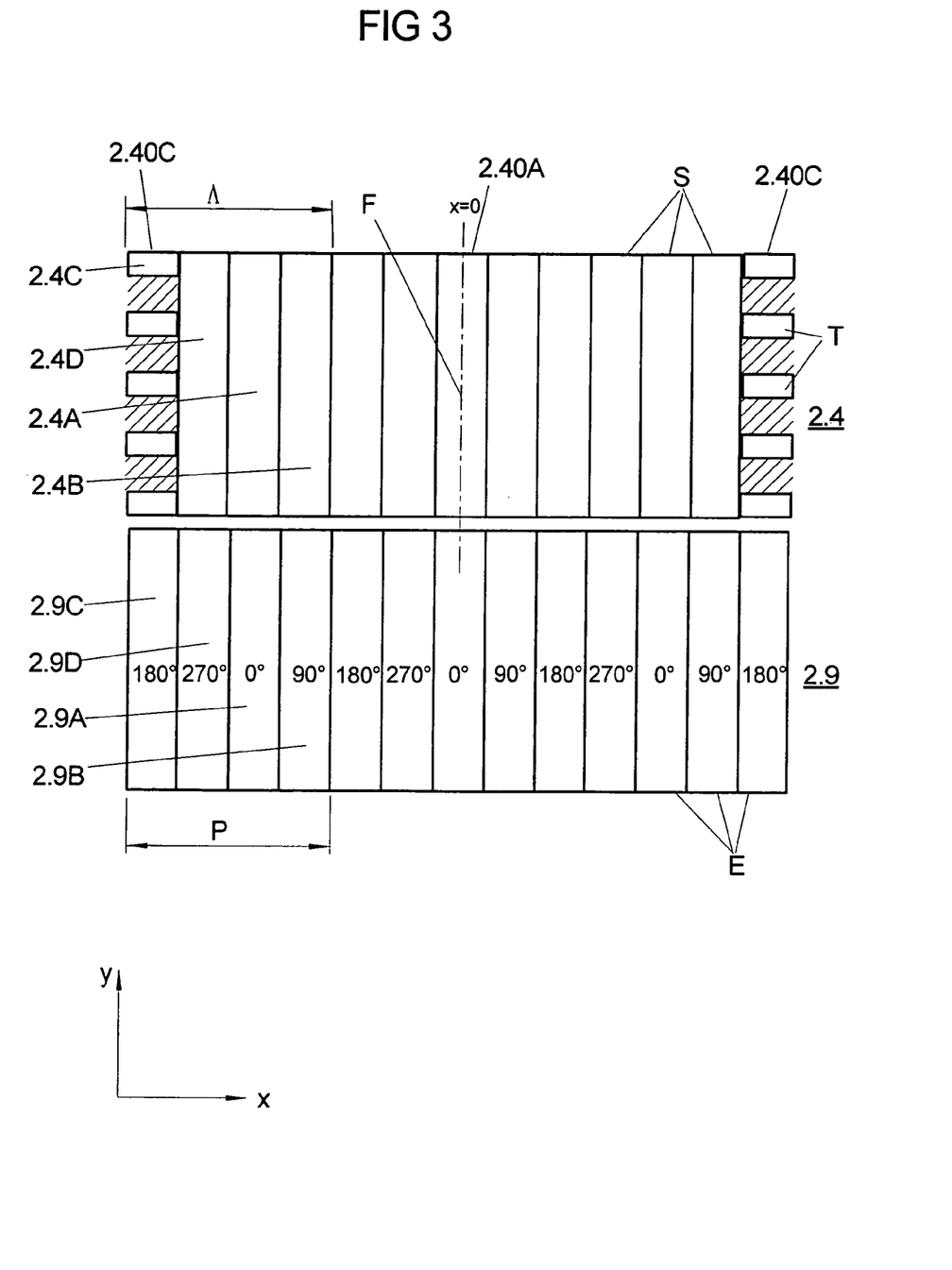
FIG. 3 illustrates an exemplary embodiment of a scanning structure and a detector arrangement for a position measuring device.

FIG. 3 illustrates a modification of the exemplary embodiment in FIG. 1, in which the two bars 2.40C of third subgroup 2.4C having reduced area are not (as in the examples illustrated in FIGS. 1 and 2) arranged at locations ±½*Λ, but rather at locations ±³⁄₂*Λ.

FIGS. 1 to 3 each illustrate only central sections of scanning structure 2.4 and detector arrangement 2.9 considered. They may be extended in symmetrical fashion (on both sides of specific axis of symmetry x=0) by, in each instance, an arbitrary (technically useful) number of periods Λ or P.

Figure 4:
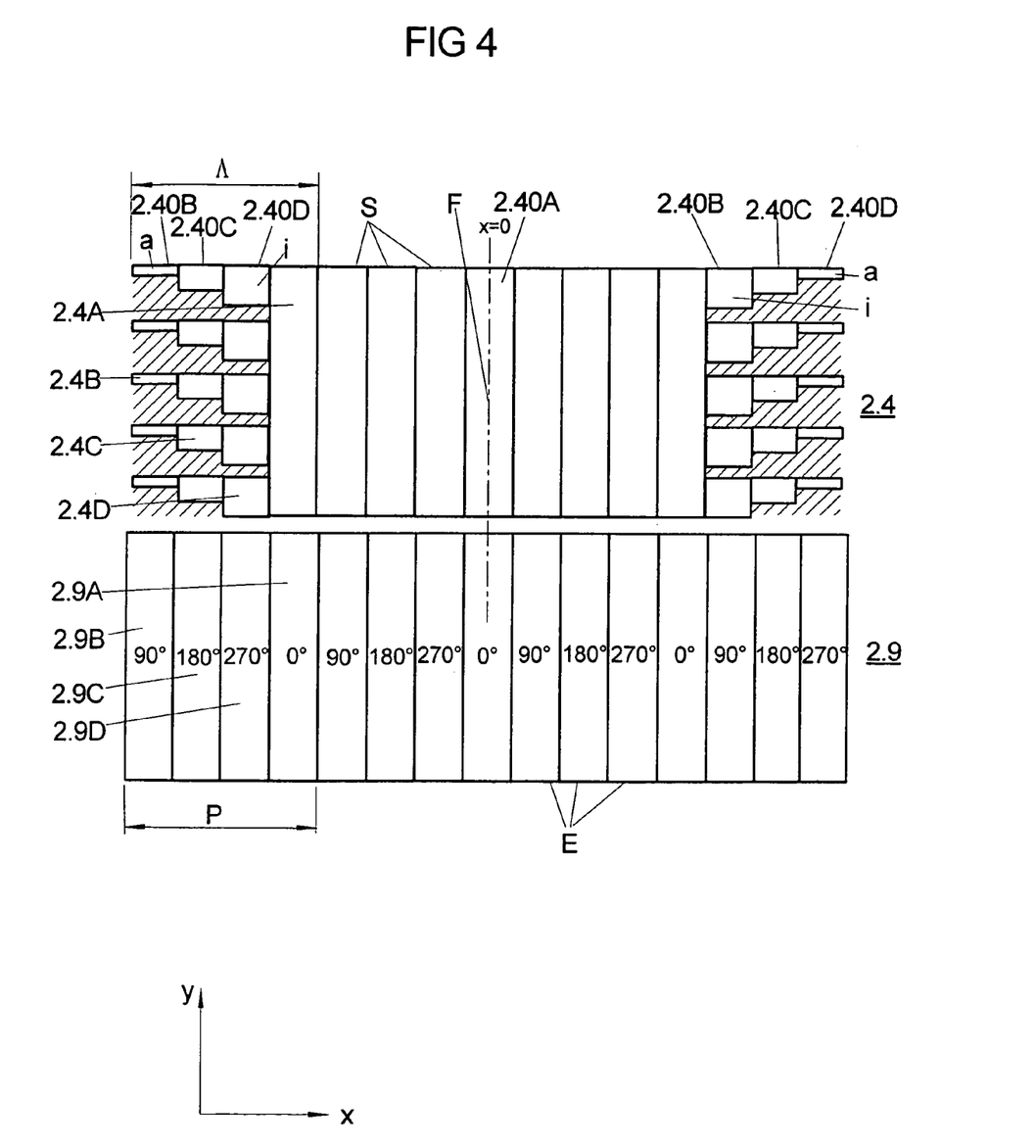
FIG. 4 illustrates an exemplary embodiment of a scanning structure and a detector arrangement for a position measuring device.

FIG. 4 illustrates a further modification of the exemplary embodiment illustrated in FIGS. 2 and 3, in which not only—as provided in FIGS. 1 to 3—area center of gravity F of first subgroup 2.4A and of third subgroup 2.4C of bars S, each considered alone, but also area center of gravity F of second subgroup 2.4B and fourth subgroup 2.4D of bars S, considered alone, coincides with area center of gravity F of the entire arrangement. To that end, not only—as in the above-described exemplary embodiments—are two bars 2.40C of third subgroup 2.4C having reduced area provided, arranged symmetrically with respect to axis of symmetry x=0 extending through area center of gravity F, but also in each case two bars 2.40B and 2.40D of reduced area of second subgroup 2.4B and fourth subgroup 2.4D of bars. Since these bars 2.40B and 2.40D, each belonging to one subgroup, namely, second subgroup 2.4B or fourth subgroup 2.4D, are not arranged symmetrically relative to axis of symmetry x=0 through area center of gravity F, it is provided that bars 2.40B and 2.40D of second and fourth subgroups 2.4B and 2.4D, respectively, each having a reduced area, have areas of different size depending on their distance from axis of symmetry x=0, in order for respective area center of gravity F to coincide with axis of symmetry x=0. Accordingly, of each pair of bars 2.40B and 2.40D, respectively, from the second and fourth subgroup having reduced area, in each case one bar 2.40B(a) or 2.40D(a) further away from axis of symmetry x=0 is more sharply reduced in area than the partner 2.40B(i) and 2.40D(i), respectively, arranged further inside (thus less far away from axis x=0). To better discern and distinguish between respective inner and outer bars 2.40B and 2.40D, in FIG. 4 the outer bars are additionally indicated by the letter a and the inner bars by the letter i.

Since, according to the exemplary embodiment illustrated in FIG. 4, bars S of second and fourth subgroups 2.4B and 2.4D altogether have a sharper area reduction than the bars of first and third subgroups 2.4A and 2.4C, in this case, the totality of bars of second and fourth subgroups 2.4B and 2.4D has one bar more than the bars of first and third subgroups 2.4A and 2.4C. It is thereby provided that the areas covered altogether by bars S of first and third subgroups 2.4A, 2.4C on one hand, and the areas covered by bars S of second and fourth subgroups 2.4B and 2.4D on the other hand are again of equal size.

For all the previously described exemplary embodiments, in each case the active area covered by each of the (four) different subgroups 2.4A or 2.4B or 2.4C or 2.4D of bars S is equal. For such subgroups which include a greater number of bars S (e.g., one bar more) than other subgroups, at least a portion of the bars has a correspondingly reduced active area, so that the total active area covered by a specific subgroup of bars is in each case the same size as the active area covered by each individual of the other (three) subgroups. This may provide equal signal amplitudes of the output signals assigned to the individual subgroups of bars.

What is claimed is:

1. A scanning unit for a position measuring device for scanning a measuring graduation of the position measuring device, comprising:
    a carrier;
    a scanning structure provided on the carrier and adapted to generate a periodic stripe pattern by interaction of electromagnetic radiation used to scan the measuring graduation; and
    a detector arrangement adapted to detect the stripe pattern, the detector arrangement including a plurality of detector elements of different phases arranged one after another and are adapted to generate output signals having a phase shift represented by a respective phase;
    wherein the detector elements of different phases are arranged one after another to form a periodic pattern, exactly one region of the scanning structure assigned to each of the detector elements, the detector elements combined to form two detector groups, at least detector elements of a same phase each belong to the same detector group, the detector elements within a detector group interconnected to generate a detector signal; and
    wherein bars of the scanning structure, corresponding to each region of the scanning structure assigned to each of the detector elements, are formed and arranged such that a totality of the bars assigned to a first detector group and a totality of the bars assigned to a second detector group each cover an active area of equal size on the carrier of the scanning structure during position measurement, the area covered by the totality of bars assigned to the first detector group and the area covered by the totality of bars assigned to the second detector group have a same area center of gravity.

2. The scanning unit according to claim 1, wherein each detector element corresponds to one of four different phases, and the detector elements corresponding to a first pair of the four phases form the first detector group, and the detector elements corresponding to a second pair of the four phases form the second detector group.

3. The scanning unit according to claim 2, wherein, in a totality of bars arranged symmetrically relative to an axis extending through the area of center of gravity, all bars assigned to detector element having a same phase are arranged symmetrically relative to the axis.

4. The scanning unit according to claim 3, wherein the area center of gravity of active areas of a subgroup of bars of the totality of bars arranged symmetrically relative to an axis extending through the area of center of gravity assigned to detector elements of a same phase coincides with the area center of gravity of active areas of all bars of the totality of bars arranged symmetrically relative to an axis extending through the area of center of gravity.

5. The scanning unit according to claim 1, wherein the detector elements corresponding to different phases are arranged alternatingly one after another, detector elements of every other phase arranged between two detector elements of a same phase.

6. The scanning unit according to claim 1, wherein the totality of the bars assigned to at least one of the two detector groups is arranged symmetrically relative to an axis extending through the area center of gravity perpendicular to an extension direction of the scanning structure.

7. The scanning unit according to claim 6, wherein both totalities of bars are arranged symmetrically relative to the axis.

8. The scanning unit according to claim 1, wherein the area center of gravity is arranged in one of the bars of the scanning structure, the bar in which the area center of gravity is arranged formed symmetrically relative to an axis extending through the area center of gravity perpendicular to an extension direction of the scanning structure.

9. The scanning unit according to claim 8, wherein the bars of the totality of bars that includes the bar in which the area center of gravity is arranged are arranged symmetrically relative to the axis.

10. The scanning unit according to claim 8, wherein each subgroup of bars that does not include the bar formed symmetrically relative to the axis includes at least two bars having a reduced active area compared to the other bars.

11. The scanning unit according to claim 1, wherein a first one of the totalities of bars includes one more bar than a second one of the totalities of bars.

12. The scanning unit according to claim 11, wherein the first totality of bars includes at least two bars arranged symmetrically relative to the axis and having a smaller active area during position measurement than the other bars of the scanning structure.

13. The scanning unit according to claim 12, wherein at least one bar having the smaller active area has a smaller elongation than the other bars in a direction transverse to the extension direction along which the bars are arranged one after another.

14. The scanning unit according to claim 12, wherein at least one bar having the smaller active area includes a plurality of bar regions set apart from each other.

15. The scanning unit according to claim 14, wherein the bar regions are set apart from each other along a direction transverse to an extension direction along which the bars are arranged one after another.

16. The scanning unit according to claim 12, wherein at least one bar having the smaller active area is formed symmetrically relative to an axis extending along an extension direction of the scanning structure.

17. The scanning unit according to claim 12, wherein the bars having the smaller active area are assigned to detector elements of a different phase than a bar in which the area center of gravity is located.

18. The scanning unit according to claim 1, wherein area centers of gravity of active areas of all subgroup of bars, which are assigned to detector elements of a same phase, coincide with the area center of gravity of the two totalities of bars.

19. The scanning unit according to claim 1, wherein the scanning structure is formed on a scanning plate.

20. The scanning unit according to claim 1, wherein the detector elements to which the bars of the scanning structure are assigned are arranged one after another in a same order as respectively assigned bars of the scanning structure.

21. A position measuring device, comprising:
a measuring graduation; and
a scanning unit adapted to scan the measuring graduation, the scanning unit including:
  a carrier;
  a scanning structure provided on the carrier and adapted to generate a periodic stripe pattern by interaction of electromagnetic radiation used to scan the measuring graduation; and
  a detector arrangement adapted to detect the stripe pattern, the detector arrangement including a plurality of detector elements of different phases arranged one after another and are adapted to generate output signals having a phase shift represented by a respective phase;

wherein the detector elements of different phases are arranged one after another to form a periodic pattern, exactly one region of the scanning structure assigned to each of the detector elements, the detector elements combined to form two detector groups, at least detector elements of a same phase each belong to the same detector group, the detector elements within a detector group interconnected to generate a detector signal; and wherein bars of the scanning structure, corresponding to each region of the scanning structure assigned to each of the detector elements, are formed and arranged such that a totality of the bars assigned to a first detector group and a totality of the bars assigned to a second detector group each cover an active area of equal size on the carrier of the scanning structure during position measurement, the area covered by the totality of bars assigned to the first detector group and the area covered by the totality of bars assigned to the second detector group have a same area center of gravity.

* * * * *